(12) United States Patent
Orf et al.

(10) Patent No.: US 11,773,203 B2
(45) Date of Patent: Oct. 3, 2023

(54) EXPANDING POLYURETHANE FOAM AND METHODS AND SYSTEMS FOR USING SAME

(71) Applicant: CertainTeed LLC, Malvern, PA (US)

(72) Inventors: Nicholas D. Orf, Natick, MA (US); Choung-Houng Lai, Acton, MA (US); Sizhu You, Auburndale, MA (US)

(73) Assignee: CertainTeed LLC, Malvern, PA (US)

( * ) Notice: Subject to any disclaimer, the term of this patent is extended or adjusted under 35 U.S.C. 154(b) by 0 days.

(21) Appl. No.: 17/137,046

(22) Filed: Dec. 29, 2020

(65) Prior Publication Data

US 2021/0198411 A1 Jul. 1, 2021

Related U.S. Application Data

(60) Provisional application No. 62/955,024, filed on Dec. 30, 2019.

(51) Int. Cl.
| | | |
|---|---|---|
| *C08G 18/18* | (2006.01) | |
| *C08G 8/12* | (2006.01) | |
| *C08G 18/48* | (2006.01) | |
| *C08G 18/42* | (2006.01) | |
| *C08G 18/76* | (2006.01) | |
| *E04B 1/74* | (2006.01) | |
| *C08J 9/14* | (2006.01) | |
| *C08G 101/00* | (2006.01) | |

(52) U.S. Cl.
CPC ............... *C08G 18/18* (2013.01); *C08G 8/12* (2013.01); *C08G 18/42* (2013.01); *C08G 18/4841* (2013.01); *C08G 18/4845* (2013.01); *C08G 18/7621* (2013.01); *C08G 18/7657* (2013.01); *C08J 9/144* (2013.01); *E04B 1/74* (2013.01); *C08G 2101/00* (2013.01); *C08G 2330/00* (2013.01); *C08J 2201/022* (2013.01); *C08J 2203/162* (2013.01); *C08J 2375/06* (2013.01); *C08J 2375/08* (2013.01)

(58) Field of Classification Search
CPC ........ C08G 18/12; C08G 18/18; C08G 18/42; C08G 18/4208; C08G 18/4829; C08G 18/4841; C08G 18/4845; C08G 18/7621; C08G 18/7657; C08G 2330/00; C08J 9/144; C08J 9/146; C08J 2201/022; C08J 2203/162; C08J 2375/06; C08J 2375/08; E04B 1/74

See application file for complete search history.

(56) References Cited

U.S. PATENT DOCUMENTS

| | | | |
|---|---|---|---|
| 4,080,238 | A | 3/1978 | Wolinski |
| 9,556,335 | B2 | 1/2017 | Chen |
| 2006/0078741 | A1 | 4/2006 | Ramalingam, Jr. |
| 2008/0281006 | A1 | 11/2008 | O'Leary |
| 2011/0303867 | A1 | 12/2011 | Ling |
| 2012/0011792 | A1 | 1/2012 | Dewildt |
| 2017/0088685 | A1 * | 3/2017 | Chen ............... C08G 18/18 |
| 2017/0313806 | A1 | 11/2017 | Yu |
| 2018/0085766 | A1 | 3/2018 | Gantenbein |

FOREIGN PATENT DOCUMENTS

JP 2018-039900 A 3/2018

* cited by examiner

*Primary Examiner* — John M Cooney
(74) *Attorney, Agent, or Firm* — McDonnell Boehnen Hulbert & Berghoff LLP

(57) ABSTRACT

The present disclosure relates generally to methods, devices and systems for insulation, e.g., of cavities associated with walls, ceilings, floors and other building structures, with foam insulation. In one aspect, the disclosure provides a method for providing a cavity of a building with an expanded foam insulation. The method includes dispensing an amount of an expanding foam insulation into the cavity, the expanding foam insulation being dispensable and expandable to provide the expanded foam insulation material, the expanding foam insulation material formed from a premix comprising at least one polyol, at least one polyisocyanate, a blowing agent, and an encapsulated catalyst, the encapsulated catalyst comprising a plurality of catalyst capsules, each comprising an amount of catalyst and a capsule shell encapsulating the catalyst, wherein the dispensing is performed to apply a force to the encapsulated catalyst sufficient to break capsules and release catalyst, the released catalyst initiating reaction between the at least one polyol and the at least one isocyanate; and then allowing the dispensed amount of expanding foam insulation to substantially finish expanding after it is dispensed in the cavity, thereby forming the expanded foam insulation in the cavity.

19 Claims, 2 Drawing Sheets

EXPANDING POLYURETHANE FOAM AND METHODS AND SYSTEMS FOR USING SAME

CROSS-REFERENCE TO RELATED APPLICATIONS

This application claims the benefit of priority of U.S. Provisional Patent Application No. 62/955,024, filed Dec. 30, 2019, which is hereby incorporated herein by reference in its entirety.

BACKGROUND OF THE DISCLOSURE

1. Field of the Disclosure

The present disclosure relates generally to materials, methods, devices and systems for insulation, e.g., of cavities associated with walls, ceilings, floors and other building structures. More particularly, the present disclosure relates to materials, methods, devices and systems for insulation with foam insulation, such as expanding foam insulation.

2. Technical Background

Heating and cooling of buildings uses approximately 35% of all the energy consumed in the United States of America. Thanks to numerous innovations in construction practices and materials used in new construction, new buildings use less than half the energy per square foot of older buildings. The number of new buildings built each year, however, is only 2% of the number of existing buildings. As most buildings last for 50 years or more, it will take several generations before low-energy new buildings begin to have a significant impact on the overall energy used by buildings in the USA. Thus, there is an urgent national need for simple low-cost retrofit energy saving technologies that can be applied to existing buildings to achieve energy use similar to new buildings.

The most common approach to reduce thermal energy use in existing buildings is "weatherization." In a typical weatherization job, a contractor seals air leaks and adds additional blown-in fibrous insulation to the attic of a building. Federal and state governments have invested billions of dollars in weatherization programs. Most studies indicate that weatherization projects result in average energy savings of only 15% and don't come close to achieving the energy use levels of new buildings. Studies of weatherization programs, conducted by MIT, the University of Chicago, and the University of California, concluded that the average annual return on government funded weatherization programs is 9%.

Another approach for reducing thermal energy use in buildings is a "deep energy retrofit". As opposed to the 15% energy savings of a weatherization job, a deep energy retrofit of a building can reduce the thermal energy use by 30%-50% or more. Typical deep energy retrofits involve tearing off siding, resetting windows, reconfiguring roof eaves, fitting foam boards to the exteriors of the building, and replacing the siding. Because of the invasiveness of this process, the cost and time involved is very high. Typical time to complete a deep energy retrofit of a house is several months and often requires building occupants to vacate the building. Typical payback time is 25 years or more. Traditional deep energy retrofits are clearly not viable on a large scale.

Two types of typical insulating materials used in building insulations include solid rigid foam insulating boards, and fibrous insulation. Rigid foam insulating boards are typically formed of a cellular structure composed of small, individual cells separated from each other. The cellular material may be glass or foamed plastic, such as polystyrene, polyurethane, polyisocyanurate, polyolefin, and various elastomeric materials. Fibrous insulation is composed of small-diameter fibers, which lay together in a loose mesh to finely divide the air space. Examples of fibrous insulation include fiberglass and mineral wool type insulations, which can be provided in loose-fil format or in so-called "batts" of a bound-together mesh of fibers.

Another important type of insulation is an expanding foam insulation. Expanding foams are typically dispensed into cavities in a building by being sprayed, injected, or poured in place. Insulation precursors are typically combined in an insulation dispenser, and dispensed as an expanding foam that finishes expanding in building cavity. Dispensing expanding foam into cavities within a building can achieve many of the same benefits of a traditional deep energy retrofit at costs that are at least an order of magnitude lower—and in days rather than months. Some foams offer many advantages over traditional fiberglass or cellulose insulation, and they can have twice the insulation value per inch serving both as an air barrier and as a vapor barrier. Energy models of a house injected with certain foam indicate that thermal energy savings of 30%-50% can be achieved. A typical house can be injected in 3 days and the modeled payback time is 5 years or less.

In one example, expanding foam is a polyurethane foam prepared from a two-component mixture: one component ("A" component) comprises an isocyanate that reacts with hydrogen-containing compounds having reactive hydroxyl groups, for example, polyester or polyether polyols, in the second component ("B" component). The reaction occurs in the presence of a catalyst and a blowing agent is provided in order to produce an expanded, cellular product. Catalyst and blowing agent are provided in one or more of the components. The catalyst is often provided together with the blowing agent in one of the components, e.g., in a polyol component. In low density, high expanding systems, a blowing agent is added which vaporizes at the outset of the reaction. In many polyurethane foam systems, the isocyanate ("A") component is maintained separate from the polyol ("B") component until the time of use. The components are mixed in a dispenser, often in the form of a "gun" having a trigger that allows a user to dispense the material. The two most common methods of mixing are impingement mixing (a "high pressure" system), in which two streams of material impact each other under high pressure and static mixing (a "low pressure" system), in which the two streams of material are interlaced using a series of mixing elements. After ejection from the dispenser, the mixed partially expanded material forms an expanding foam that is sprayed onto roof tiles, concrete slabs, into wall cavities, or through holes drilled into a cavity of a finished wall. Once in place, the mixed foam fully expands.

As noted above, blowing agents are generally used in expanding foams. Heat generated when the polyisocyanate reacts with the polyol can volatilizes the blowing agent contained in the liquid mixture, thereby forming bubbles therein. Most commonly used blowing agents include hydrocarbons, fluorocarbons, chlorocarbons, fluorochlorocarbons, and the like. Some of these compounds have found to be greenhouse gases, and there has been a move toward compounds that have low environmental impact and low global warming potential.

Therefore, what is needed are efficient and environmentally friendly methods, devices and systems for insulating building cavities with foam insulation.

SUMMARY OF THE DISCLOSURE

In one aspect, the present disclosure provides method for providing a cavity of a building with an expanded foam insulation, the cavity being enclosed by one or more walls including a first wall. The method includes dispensing an amount of an expanding foam insulation into the cavity, the expanding foam insulation being dispensable and expandable to provide the expanded foam insulation material, the expanding foam insulation material formed from a premix comprising at least one polyol, at least one polyisocyanate, a blowing agent, and an encapsulated catalyst, the encapsulated catalyst comprising a plurality of catalyst capsules, each comprising an amount of catalyst and a capsule shell encapsulating the catalyst, wherein the dispensing is performed to release catalyst from the capsules, the released catalyst initiating reaction between the at least one polyol and the at least one isocyanate; and then allowing the dispensed amount of expanding foam insulation to substantially finish expanding and curing after it is dispensed in the cavity, thereby forming the expanded foam insulation in the cavity.

In certain desirable embodiments, the dispensing is performed to apply a force to the encapsulated catalyst sufficient to break shells of the capsules, thereby releasing the catalyst (e.g., without melting shells of the catalyst).

Another aspect of the disclosure is an expanded foam insulation material that is the cured product of an expanding foam insulation product prepared by method as described herein.

Another aspect of the disclosure is a system configured to perform a method as described herein.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure and, together with the description, serve to explain the principles and operation of the disclosure.

DETAILED DESCRIPTION

Figure 1:
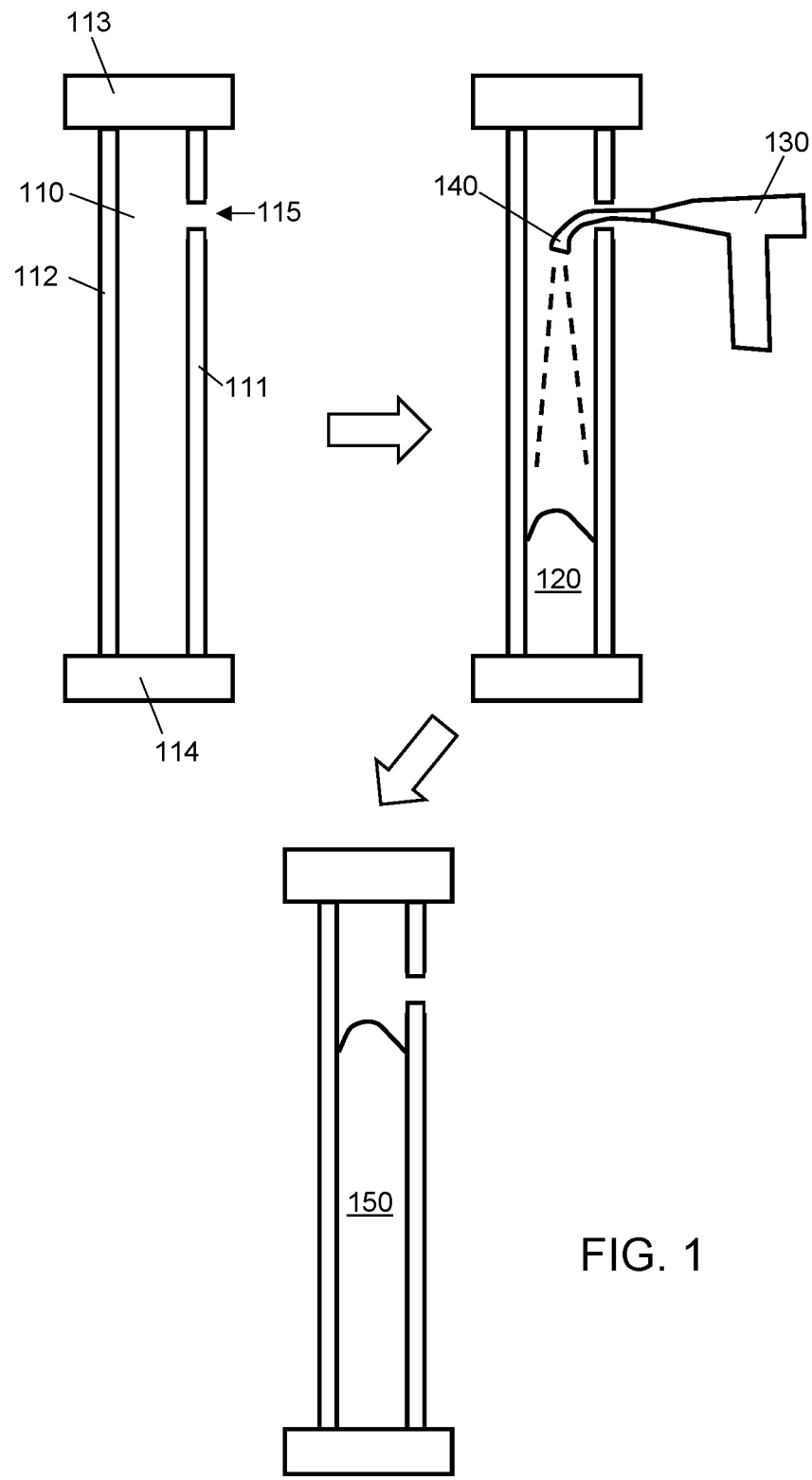
FIG. 1 is a schematic cross-sectional view of the dispensing of foam insulation into a cavity at least partially enclosed by one or more walls according to one embodiment of the disclosure.

The present inventors have noted that hydrohaloolefins such as hydrofluorolefins (HFOs) and hydrochlorofluoroolefins (HCFOs) are more environmentally acceptable blowing agents than many conventional blowing agents. Some common catalysts used in polyurethane systems, e.g., amine catalysts, however, are reactive towards HFOs and HCFOs, which can result in a partial reaction of the olefinic blowing agent before dispensing (e.g., during storage when combined together in one of the polyurethane components), and thus lead to poor foam structure. It would be preferred to address the reactivity of the amine catalyst with HFO and HCFO by avoiding a change in the way the foams are made.

The present inventors have determined that encapsulated catalysts can advantageously be used in expanding foam insulation materials. While this is especially useful when the blowing agent is an HFO or HCFO as described below, the present inventors contemplate that it can be useful in a variety of contexts in which it is desirable to protect the catalyst from premature reaction. Accordingly, in certain aspects, a method for providing a cavity of a building with an expanded foam insulation includes dispensing an amount of an expanding foam insulation into the cavity, the expanding foam insulation being dispensable and expandable to provide the expanded foam insulation material, the expanding foam insulation material formed from a premix comprising at least one polyol, at least one polyisocyanate, a blowing agent, and an encapsulated catalyst, the encapsulated catalyst comprising a plurality of catalyst capsules, each comprising an amount of catalyst and a capsule shell encapsulating the catalyst, wherein the dispensing is performed to release catalyst from the catalyst capsules, the released catalyst initiating reaction between the at least one polyol and the at least one isocyanate; and then allowing the dispensed amount of expanding foam insulation to substantially finish expanding and curing after it is dispensed in the cavity, thereby forming the expanded foam insulation in the cavity.

The present inventors have noted that the catalyst can be encapsulated into capsules made from materials having a melting point substantially greater than a temperature at which the premix is dispensed. Such capsules can be simply broken by applying a sufficient force (e.g., such as by shearing or other mechanical means) thereby releasing the catalyst required for the polymerization. This is advantaged, in that it does not require heating to initiate polymerization, and can be performed with at most a simple modification to conventional dispensing apparatuses (e.g., to ensure sufficient shear during dispensing to break the capsules).

Accordingly, in certain aspects, the method for providing a cavity of a building with an expanded foam insulation includes dispensing an amount of an expanding foam insulation into the cavity, the expanding foam insulation being dispensable and expandable to provide the expanded foam insulation material, the expanding foam insulation material formed from a premix comprising at least one polyol, at least one polyisocyanate, a blowing agent, and an encapsulated catalyst, the encapsulated catalyst comprising a plurality of catalyst capsules, each comprising an amount of catalyst and a capsule shell encapsulating the catalyst, wherein the dispensing is performed to apply a force to the encapsulated catalyst sufficient to break capsules and release catalyst, the released catalyst initiating reaction between the at least one polyol and the at least one isocyanate; and then allowing the dispensed amount of expanding foam insulation to substantially finish expanding and curing after it is dispensed in the cavity, thereby forming the expanded foam insulation in the cavity.

The force can be any force sufficient to cause sufficient capsules to break to release sufficient catalyst to catalyze the substantially complete curing of the expanding foam. In certain desirable embodiments, the force sufficient to break the capsule and release the catalyst is a shearing force. Preferably, such force is sufficient to break capsules without melting their capsule shells.

Methods and structures to provide sufficient shearing or other force are generally known in the art, and can be adapted based on the present disclosure in the practice of the claimed methods. For example, the force may be generated by dispensing the expanding foam insulation into the cavity through an orifice (e.g., of an insulation dispenser). The orifice may be constricted (e.g., diameter reduced) to result in the sufficient force. Of course, constrictions other than a dispensing orifice can provide a force (e.g., a shearing force) to the. For example, in other examples, a constriction can be formed by opposing plates or a narrowing of a tubing or other passageway through which a fluid flows. Other structures can be used, e.g., one or more indentations, pins, meshes, or other structures that provide shear through turbulence. In some embodiments, conventional dispensing devices such as conventional dispensing guns will have a structure that, at a desirable flow rate and pressure, will provide sufficient force to break capsules. The person of ordinary skill in the art can adjust flow rates and pressures, e.g., depending on the particular material and thickness of the capsule shells, to result in a sufficient force to break capsules during dispensing.

As described above, in certain advantageous embodiments, the dispensing is performed without melting shells of the capsules. However, the present inventors contemplate that in other embodiments, the dispensing is performed to melt capsules of the encapsulated catalyst, thereby releasing the catalyst. The melting of the capsules can occur in conjunction with a force as described above, or can itself be responsible for releasing the catalyst. Melting can be provided, e.g., by providing heat in a dispenser used to dispense the expanding foam insulation (e.g., using a heating element adjacent a flow path of the dispenser).

And the person of ordinary skill in the art will appreciate that, depending on the particular materials of the capsule shell and the remainder of the composition, other methods for releasing catalyst from the encapsulated may be used.

Expanding foam insulation materials based on polyurethane foams are generally known in the art, and are formed from a premix comprising at least one polyol and at least one polyisocyanate. Premix components are usually kept separate until dispensing, with one component ("A") typically including at least one polyisocyanate (i.e., bearing more than one reactive isocyanate moiety) and another component ("B") typically including at least one polyol (i.e., bearing more than one reactive alcohol moiety)). It will be appreciated that components actually provided as part of the premix (e.g., in a plurality of containers to be mixed together at the time of dispensing) are often oligomeric or prepolymeric in nature. Release of the catalyst causes the premix to begin to react, thus forming the expanding foam insulation.

A variety of polyols can be used in the polyurethane foams of the disclosure. In certain embodiments, the at least one polyol includes at least one polyether polyol (e.g., a polyethylene oxide/polypropylene oxide polyol) and/or at least one polyester polyol (e.g., aromatic or aliphatic). Examples of commercially available polyols suitable for use in the methods of the disclosure include, but are not limited to, glycerin based polyether polyols such as Carpol GP-700, Carpol GP-725, Carpol GP-4000, Carpol GP-4520, etc., amine based polyether polyols such as Carpol TEAP-265, Carpol EDAP-770, Jeffol AD-310, etc., Mannich based polyether polyol such as Jeffol R-425x, Jeffol R-470x, etc., aromatic polyester polyols such as Terate 2541, Terate 3510, Stepanpol PS-2352, Terol TR-925, etc. Other polyols can be used, e.g., sugar or sugar alcohol-based polyols like alkoxylated sorbitols, and natural oil-based polyols such as ricinoleic triglycerides and alkoxylated versions thereof. Examples of commercially available polyols suitable for use in the methods of the disclosure include, but are not limited to, sucrose based polyether polyol, such as Jeffol SD-360, SG-361, and SD-522, Voranol 490, Carpol SPA-357, etc., and sorbitol based polyether polyol such as Jeffol S-490, etc.

A variety of polyisocyanates can be used in the premix of the disclosure. In certain embodiments, the at least one the at least one polyisocyanate includes toluene diisocyanate or methylene diphenyl diisocyanate. Both polyols and polyisocyanates can be provided in oligomeric form, e.g., a reaction product of an excess of polyol with polyisocyanate to provide a polyol-functional oligomer, or a reaction product of an excess of polyisocyanate with polyol to provide an polyisocyanate-functional oligomer. Oligomeric or polymeric forms of isocyanates, e.g., oligomeric or polymeric MDI can also be used.

A blowing agent (a gas, or a material that will evolve gas) is typically used to foam and expand the A+B reaction product. As used herein, an "expanding" foam material is one that expands to at least 120% of its as-dispensed volume after it is dispensed in a cavity. In certain embodiments, the expanding material used in conjunction with the methods, devices and systems described herein expand to at least two times its as-dispensed volume after it is dispensed in a cavity, e.g., 2-5 times. Reference herein to a material as "expanded" relates to the material after it is in its final, expanded state. Typically, the blowing agent is a hydrohalocarbon (e.g., saturated hydrohalocarbon or unsaturated hydrohaloolefin). In certain especially desirable embodiments of the methods, compositions and systems of the disclosure, the blowing agent has low global warming potential, such as unsaturated hydrohalocarbon (e.g., hydrofluoroolefin or hydrochlorofluoroolefin) blowing agent. The present inventors have noted that the use of an encapsulated catalyst (especially an encapsulated amine catalyst) can advantageously allow for the use of conventional polyurethane chemistries with HFOs and HCFOs without undesirable decomposition of the blowing agent.

In certain embodiments, the blowing agent is a $C_3$-$C_6$ hydrofluoroolefin, such as trifluoropropene, tetrafluoropropene, pentafluoropropene, tetrafluorobutene, pentafluorobutene, hexafluorobutene, heptafluorobutene, heptafluoropentene, octafluoropentene, or nonafluoropentene (i.e., in any isomeric form). For example, the blowing agent may be one of, but not limited to, 1,2,3,3,3-pentafluoropropene (HFO1225ye), 1,3,3,3-tetrafluoropropene (HFO1234ze), 2,3,3,3-tetrafluoropropene (HFO1234yf), 1,2,3,3-tetrafluoropropene (HFO1234ye), 3,3,3-trifluoropropene (1243zf), tetrafluorobutenes (HFO1345), pentafluorobutenes (HFO1354), hexafluorobutenes (HFO1336), heptafluorobutenes (HFO1327), heptafluoropentenes (HFO1447), octafluoropentenes (HFO1438), and nonafluoropentenes (HFO1429).

In certain embodiments, the blowing agent is a $C_3$-$C_6$ hydrochlorofluoroolefin, e.g., 1-chloro-3,3,3-trifluoropropene (HCFO-1233zd), 2-chloro-3,3,3-trifluoropropene (HCFO-1233xf), dichlorotrifluoropropene (HCFO-1223), 1,2-dichloro-1,2-difluoroethene, 3,3-dichloro-3-fluoropropene, 2-chloro-1,1,1,4,4,4-hexafluorobutene-2, and 2-chloro-1,1,1,3,4,4,4-heptafluorobutene-2 (i.e., in any isomeric form).

In certain embodiments, the blowing agent is substantially free of (i.e., is not) a saturated hydrocarbon or hydrohalocarbon, such as a saturated fluorocarbon, saturated chlorocarbon, or saturated fluorochlorocarbon. For example, the premix comprises less than 1 wt %, or less than 0.1 wt %, or even less than 0.05 wt % of hydrocarbon or hydrohalocarbon, based on the total weight of the premix.

The blowing agent (e.g., a single blowing agent or a mixture of blowing agents) may be present in an amount of up to 50 wt %, based on the total weight of the premix. For example, the amount of the blowing agent in the premix is in a range from 1 wt % to 50 wt %, 1 wt % to 30 wt %, 1 wt % to 20 wt %, 1 wt % to 10 wt %, 1 wt % to 5 wt %, 5 wt % to 50 wt %, 5 wt % to 30 wt %, 5 wt % to 20 wt %, 5 wt % to 10 wt %, 10 wt % to 50 wt %, 10 wt % to 30 wt %, 10 wt % to 20 wt %, 20 wt % to 50 wt %, 30 wt % to 50 wt %, or 20 wt % to 30 wt %, based on the total weight of the premix.

In certain embodiments, the blowing agent may further comprise one or more co-blowing agents, such as hydrocarbons, saturated hydrohalocarbon, alcohols, aldehydes, ketones, ethers/diethers, and $CO_2$ generating materials (e.g., a carbonate, a bicarbonate, organic acid (e.g., such as formic acid), water (through reaction with isocyanate)). For example, water forms $CO_2$ from the reaction with isocyanate, and when water is used as the co-blowing agent, it can be present in a range of 0.1 wt % to 3 wt %, based on the total weight of the premix.

A catalyst is typically used to promote the reaction of the hydroxyl and isocyanate groups on the polyol and polyisocyanate, and/or promote the reaction between water and isocyanate groups to generate $CO_2$ blowing agent. One commonly used catalyst is an amine catalyst (e.g., tertiary amine or an oxygenate thereof, and sterically hindered secondary amine or an oxygenate thereof), well-known to one of skill in the art. Some examples of amine catalysts suitable for use in the methods of the disclosure include, but are not limited to, triethylamine (TEA), 1,8-diazabicyclo [5.4.0]undecene-7 (DBU), benzyldimethylamine (BDMA), pentamethyldiethylenetriamine (PMDETA), triethylenediamine (TEDA), dimethylcyclohexylamine (DMCHA), and dimethylethanolamine (DMEA), tetramethylbutanediamine (TMBDA), pentamethyldipropylenetriamine, 1,4-diazadicyclo[2,2,2]octane (DABCO), N,N-dimethylcyclohexylamine (DMCHA), bis(N,N-dimethylaminoethyl)ether (BDMAFE), N-(3-dimethylaminopropyl)-N,N-diisopropanolamine, bis-(2-dimethylaminoethyl)ether, morpholine and N-alkylmorpholine (e.g., N-methylmorpholine and N-ethylmorpholine), imidazole and N-alkylimidazole (e.g., N-methylimidazole), N,N-dimethylbenzylamine, N,N'-diethylpiperazine, dicyclohexylmethylamine, ethyldiisopropylamine, dimethylcyclohexylamine, dimethylisopropylamine, methylisopropylbenzylamine, methylcyclopentylbenzylamine, bis-(2-dimethylaminoethyl)ether, N,N-dimethylethanolamine, N,N,N'-trimethyl-N'-hydroxyethyl-bis(aminoethyl)ether, N'-(3-(dimethylamino)propyl)-N,N-dimethyl-1, 3-propanediamine, etc.

In certain exemplary embodiments of the methods and systems as described herein, the blowing agent is an unsaturated hydrofluorocarbon (such as hydrofluoroolefin or hydrochlorofluoroolefin) and the catalyst is an amine catalyst. The present inventors have noted that the use of an encapsulated amine catalyst can advantageously allow for the use of conventional polyurethane chemistries with HFOs and HCFOs without undesirable decomposition of the blowing agent.

In certain embodiments, the amine catalyst may be present in an amount in the range of 0.001 wt % to 5 wt %, based on the total weight of the premix. For example, in certain embodiments, the amount of the amine catalyst in the premix is in a range from 0.001 wt % to 3 wt %, 0.001 wt % to 2 wt %, 0.001 wt % to 1.5 wt %, 0.001 wt % to 1 wt %, 0.001 wt % to 0.5 wt %, 0.5 wt % to 5 wt %, 0.5 wt % to 3 wt %, 0.5 wt % to 2 wt %, 0.5 wt % to 1.5 wt %, 0.5 wt % to 1 wt %, 1 wt % to 5 wt %, 1 wt % to 3 wt %, 1 wt % to 2 wt %, 1 wt % to 1.5 wt %, 1.5 wt % to 5 wt %, 1.5 wt % to 3 wt %, 1.5 wt % to 2 wt %, 2 wt % to 5 wt %, 2 wt % to 3 wt %, or 3 wt % to 5 wt %, based on the total weight of the premix.

As noted above, the catalyst may be encapsulated into capsules that can be simply broken by applying a sufficient force (e.g., such as by shearing or other mechanical means) thereby releasing the catalyst required for the polymerization. In certain such embodiments, the capsule shells are made from a material having a melting point substantially greater than a temperature at which the premix is dispensed. For example, in certain embodiments, the capsule shells are formed of a material having a melting point substantially greater than a temperature at which the premix is dispensed, e.g., at least 5° C. greater, or at least 10° C. greater, or at least 15° C. greater, or at least 20° C. greater. In certain embodiments, the premix is dispensed at a temperature of no more than 50° C., e.g., no more than 40° C., or no more than 35° C. Thus, in certain embodiments, the capsule shells are formed of a material having a melting point greater than 40° C., e.g., greater than 45° C., greater than 50° C., greater than 55° C., greater than 60° C., greater than 65° C., or even greater than 70° C. In other embodiments, the capsule shells are formed of a material having a melting point greater than 100° C., e.g., greater than 125° C., or greater than 150° C. Melting points as described herein are determined by DSC (peak endotherm). In certain embodiments as otherwise described herein, the material of the capsule has a glass transition temperature substantially greater than a temperature at which the premix is dispensed, e.g., at least 5° C. greater, or at least 10° C. greater, or at least 15° C. greater, or at least 20° C. greater. Thus, in certain embodiments, the capsule shells are formed of a material having a glass transition temperature greater than 40° C., e.g., greater than 45° C., greater than 50° C., greater than 55° C., greater than 60° C., greater than 65° C., or even greater than 70° C. In other embodiments, the capsule shells are formed of a material having a glass transition temperature greater than 100° C., e.g., greater than 125° C., or greater than 150° C. As used herein, differential scanning calorimetry is used to determine glass transition temperature.

In certain embodiments, the capsule is formed from a polymer. For example, in certain embodiments, the capsule may be formed from a polystyrene, polyethylene, polyacrylate, polymethacrylate, melamine, polyolefin, polyester, polyamide, polylactate, polyether, polyalkylene glycol, and the like. In certain embodiments, the capsule is formed from a cellulosic material or a microcrystalline wax.

As the person of ordinary skill in the art will appreciate, the encapsulated catalyst size distribution can be characterized by d50, d10 and d90 values, where d50 is the median capsule size, d10 is the capsule size at the 10th percentile of capsule ranked by size, and d90 is the capsule size at the 90th percentile of capsules ranked by size. In certain embodiments as otherwise described herein, the encapsulated catalyst has a d50 value in the range of 0.1 μm to 100 μm; e.g., 0.1 μm to 50 μm, or 0.1 μm to 10 μm, or 0.1 μm to 1 μm, or 1 μm to 100 μm, or 1 μm to 50 μm, or 1 μm to 10 μm, or 10 μm to 100 μm, or 10 μm to 50 μm, or 50 μm to 100 μm. In certain embodiments, d10 is no less than 50% of d50 and d90 is no more than 200% of d50. In certain embodiments, d10 is no less than 75% of d50 and d90 is no more than 125% of d50. In certain embodiments, d10 is no less than 80% of d50 and d90 is no more than 120% of d50.

In certain embodiments, the premix further comprises a surfactant, such as silicon or non-silicon based surfactants. In certain embodiments, the surfactant may be provided as encapsulated surfactant, independent of the encapsulated catalyst. The materials that can encapsulate the catalyst can be formed from the same material as described above in the context of the capsules used to encapsulate the catalyst. Some examples of surfactants include, but are not limited to, polysiloxane polyoxyalkylene block co-polymers (e.g., TEGOSTAB® B8404, B8407, B8409, B8110, B8465, etc., Dow Corning® 193, 197, 2936, etc.), sulfonate salts, fatty acid salts, dodecylbenzenedisulfonic acid, dinaphthylmethanedisulfonic acid, ricinoleic acid, an oxyethylated alkylphenol, an oxyethylated fatty alcohol, and a paraffin fatty alcohol. In certain embodiments, the surfactant may be present in an amount in the range of 0.1 wt % to 5 wt %, based on the total weight of the premix; e.g., 0.1 wt % to 3 wt %, 0.1 wt % to 2 wt %, 0.1 wt % to 1.5 wt %, 0.1 wt % to 1 wt %, 0.1 wt % to 0.5 wt %, 0.5 wt % to 5 wt %, 0.5 wt % to 3 wt %, 0.5 wt % to 2 wt %, 0.5 wt % to 1.5 wt %, 0.5 wt % to 1 wt %, 1 wt % to 5 wt %, 1 wt % to 3 wt %, 1 wt % to 2 wt %, 1 wt % to 1.5 wt %, 1.5 wt % to 5 wt %, 1.5 wt % to 3 wt %, 1.5 wt % to 2 wt %, 2 wt % to 5 wt %, 2 wt % to 3 wt %, or 3 wt % to 5 wt %, based on the total weight of the premix.

In certain embodiments, the premix further comprises a non-amine catalyst, such as, but not limited to, inorganometallic compound, an organometallic compound, a quaternary ammonium carboxylate catalyst, and the like. Such non-amine catalyst may be useful in promoting a reaction between water and isocyanate groups and aid in generation of $CO_2$ blowing agent. For example, the non-amine catalyst may be bismuth nitrate, lead 2-ethylhexoate, lead benzoate, lead naphthanate, ferric chloride, antimony trichloride, antimony glycolate, tin carboxylate, dialkyl tin carboxylate, potassium acetate, potassium octoate, potassium 2-ethylhexoate, potassium carboxylate, zinc carboxylate, zinc 2-ethylhexanoate, glycinoate, sodium N-(2-hydroxy-5-nonylphenol)methyl-N-methylglycinate, tin (II) 2-ethylhexanoate, dibutyltin dilaurate, etc. In certain embodiments, the non-amine catalyst may be present in an amount in the range of 0.25 wt % to 3 wt %, based on the total weight of the premix. For example, in certain embodiments the amount of the non-amine catalyst in the premix is in a range from 0.25 wt % to 2 wt %, 0.25 wt % to 1.5 wt %, 0.25 wt % to 1 wt %, 0.25 wt % to 0.5 wt %, 0.5 wt % to 3 wt %, 0.5 wt % to 2 wt %, 0.5 wt % to 1.5 wt %, 0.5 wt % to 1 wt %, 1 wt % to 3 wt %, 1 wt % to 2 wt %, 1 wt % to 1.5 wt %, 1.5 wt % to 3 wt %, 1.5 wt % to 2 wt %, or 2 wt % to 3 wt %, based on the total weight of the premix.

In certain embodiments, an expanded foam insulation material as otherwise described herein has a flame spread less than 25 at a thickness of 4" as measured by ASTM E84. And, in certain embodiments, an expanded foam insulation material as otherwise described herein has a smoke index less than 450 at a thickness of 4" as measured by ASTM E84. These two parameters together make up the so-called "Class A" fire rating according to ASTM E84.

In certain desirable embodiments, especially for use in various dispensing methods as described herein, it can be desirable for the volume of expanded foam insulation material to be relatively linear with the mass of the dispensed expanding foam insulation material. For example, in certain embodiments, for a volume of expanded foam insulation material over the range of 1000 $cm^3$ to 100000 $cm^3$, the volume of expanded foam insulation material does not deviate from a linear relationship with the mass of expanding foam insulation material by more than 15%, e.g., does not deviate by more than 10%.

In certain embodiments as otherwise described herein, the expanding foam insulation material is a polyurethane material having an iso index in the range of 80-450, e.g., 85-400 or 90-300. The iso index is the ratio of isocyanate moieties (or reaction products thereof) to polyol moieties (or reaction products thereof) in the expandable material, expressed as a percentage. An excess of isocyanate allows the formation of cyclic isocyanurate groups via reaction of three isocyanates. Isocyanurate groups can help improve the fire performance of a polyurethane foam insulation material. Accordingly, in certain embodiments as otherwise described herein, the expanding foam insulation material is a polyurethane material having an iso index in the range of 100-450, e.g., 100-350 or 100-250. In certain embodiments, the expanding foam insulation material is a polyurethane material having an iso index in the range of 110-450, e.g., 110-350, or 110-250, or 125-450 or 125-350 or 125-250. Polymeric methylene diphenyl isocyanate can be used to provide isocyanurate groups.

It can also be desirable to formulate materials using particulate fire retardants. For example, in certain embodiments, an expanding foam insulation material includes one or more particulate fire retardants, e.g., selected from melamine polyphosphate, ammonium polyphosphate, and expandable graphite. In certain embodiments, such particulate fire retardants are present in an amount up to 30 wt %, e.g., 1-30 wt %, or 5-20 wt %, or 1-10 wt %, or 5-15 wt %. Throughout this disclosure, wt % values are provided with respect to the total weight of a material. In order to prevent the hard-packing of such particulate fire retardants as they settle over time, it can be desirable to additionally include a hydrophobic silica having a D50 particle size in the range of 10-1000 nm.

Water-containing minerals can also be used to improve the fire resistance of a material as described herein. For example, in certain embodiments, an expanding foam insulation material as otherwise described herein includes one or more water-containing minerals having a dehydratable water content of at least 20 wt %. The dehydratable water is water that will be dehydrated from the mineral at or below a temperature of 400° C. This can be, for example, water bound as water of crystallization (e.g., as in gypsum), or water nominally present as hydroxide (e.g., as in aluminum trihydroxide). And in certain embodiments, an expanding foam insulation material as otherwise described herein includes one or more water-containing minerals having a dehydratable water content, the one or more minerals being selected from aluminum trihydrate (e.g., gibbsite), magnesium dihydrate, gypsum and magnesium carbonate hydrate. The water-containing minerals can in some embodiments be provided with coatings to enhance compatibility with the polymeric material of the foam (e.g., a hydrophobic coating). The water-containing minerals can be present in any suitable amount, such as wherein the one or more water-containing minerals are present in the expanding foam insulation in an amount in the range of 5-60 wt %, e.g., 5-45 wt % or 15-60 wt % or 15-45 wt % or 30-60 wt %.

Halogenated flame retardants can also be used to improve the flame performance of the materials. For example, in certain embodiments as otherwise described herein, one or more halogenated flame retardants are present in the expanding foam insulation material. Examples include, e.g., brominated alcohols such as polybrominated diphenyl ethers, tribromoneopentyl alcohol, tetrabromophthalates (e.g., tetrabromophthalate diol such as PHT4-diol (Great Lakes) and their reaction products; dibromoneopentyl glycol, tribromophenol, and reaction products thereof; chlorinated organophosphates such as tris(1,3-dichloroisopropyl) phosphate, (1-chloro-2-propyl) phosphate, 2,2-bis(chloromethyl)propane-1,3-diyl tetrakis(1-chloropropan-2-yl) bis(phosphate), and tris (2-chloroethyl) phosphate; and chlorinated paraffins. In certain embodiments, the halogenated flame retardant is present in the composition in an amount up to 20 wt %, e.g., 5-20 wt %, or 10-20 wt %. In certain such embodiments, it can be desirable to include antimony trioxide in combination with the halogenated flame retardants, e.g., in an amount in the range of 50%-400% of the weight of the halogenated flame retardant(s), e.g., 100%-300%.

Phosphate-based flame retardants can also be used to improve the fire resistance of the expanding foam insulation materials of the disclosure. In certain embodiments as otherwise described herein, the expanding foam insulation material includes a non-halogenated phosphate flame retardant, e.g., triethyl phosphate (TEP), resorcinol bis(diphenyl phosphate), and phosphate plasticizers. In certain such embodiment, the non-halogenated phosphate flame retardant is present in the expanding foam insulation material in an amount in the range of 0.5 wt % to 20 wt %, e.g., 1-20 wt %, 5-20 wt %, 1-10 wt % or 5-15 wt %.

In certain embodiments, an expanding foam insulation material as otherwise described herein includes a reactive phosphorus-based flame retardant. Examples include polyphosphonate-co-carbonates (e.g., Nofia products from FRX), phosphorus polyols (e.g., OP550 or OP560 from Clariant), alkylphosphate oligomers (e.g., Fyrol PNX from ICL), diethyl (hydroxymethyl) phosphonate, and 9-10-dihydro-9-oxa-10-phosphaphenanthrene-10-oxide (DOPO) and its derivatives. In certain embodiments, the reactive phosphorus-based flame retardant is present in the composition in an amount up to 20 wt %, e.g., 1-20 wt %, or 5-20 wt %, or 10-20 wt %, or 1-10 wt %, or 5-10 wt %, or 1-5 wt %.

The person of ordinary skill in the art, based on the present disclosure, can use one or more of the techniques described herein to provide desirable fire resistance. In certain embodiments, the compositions described herein will include at least 40 wt %, e.g., at least 50 wt %, at least 60 wt %, or at least 70 wt % of polyol and polyisocyanate components.

The expanding foam insulation is typically in a partially-expanded state as it is dispensed into the building cavity, where it continues to expand to its final expanded state. However, the person of ordinary skill in the art will appreciate that the expanding foam insulation can be dispensed in a variety of forms. The expanding foam insulation may not yet be substantially expanded, such that it is substantially expanded only in the cavity. For example, the premix components can mix in the dispenser to react and begin to expand, so that a partially-expanded foam is what is dispensed into the cavity. Material described herein as "expanding insulation foam" encompasses any set of one or more precursors and/or reaction products thereof that are admitted together to the cavity and form the expanded foam insulation.

While the expansion of the foam will typically take some time to occur, in certain desirable embodiments the time of 95% maximum foam height is no more than 4 minutes, e.g., no more than 3 minutes. However, it can be desirable for the foam not to expand instantaneously; in certain embodiments, the time of 95% maximum foam height is at least 20 seconds, e.g., at least 40 seconds.

Desirable expanding foam insulation materials have a relatively low shrinkage from the maximum foam height. For example, in certain desirable embodiments, an expanding foam insulation as otherwise described herein has a shrinkage after five minutes (i.e., from the time of dispensing, measured as a percentage of maximum height in the FOAMAT® Foam Qualification System) of no more than 5%.

It can be desirable for the temperature in the expanding and curing foam not to get too high. In certain embodiments, the internal temperature of the foam (e.g., at the geometric center) is no more than 120° C., e.g., no more than 100° C., or no more than 80° C.

In certain desirable embodiments, especially for use in various dispensing methods as described herein, it can be desirable for the volume of expanded foam insulation material to be relatively linear with the mass of the dispensed expanding foam insulation material. For example, in certain embodiments, for a volume of expanded foam insulation material over the range of 1000 cm$^3$ to 100000 cm$^3$, the volume of expanded foam insulation material does not deviate from a linear relationship with the mass of expanding foam insulation material by more than 15%, e.g., does not deviate by more than 10%.

In certain embodiments of the methods as otherwise described herein, the cavity has a first wall having an aperture formed therein, and wherein the expanding foam insulation is dispensed into the cavity from the insulation dispenser through the aperture. The aperture can be preformed, or, in other embodiments, the method can include forming the aperture in the first wall before performing the one or more discrete dispensing shots. The aperture can be patched after dispensing the foam insulation.

FIG. 1 is a schematic cross-sectional view of one embodiment of a method of dispensing of expanding foam insulation material into a cavity at least partially enclosed by one or more walls. Wall cavity 110 includes a first wall 111, a second wall 112, a third wall 113 and a fourth wall 114, defining a substantially enclosed cavity. Wall cavity 110 can be closed off by two additional walls, e.g., parallel to the plane of the page. As is conventional, these walls can be formed of a variety of materials, e.g., wallboard, lath and plaster, cement, wood, metal, and different materials can be used in different walls of a particular cavity. One or more of the walls enclosing the cavity can be formed from framing members; in the example of FIG. 1, the first and second walls are wallboards and the third and fourth walls are framing members. And the person of ordinary skill in the art can appreciate that different cavities may have different shapes and thus different numbers of walls enclosing them. As used herein, a "substantially enclosed" cavity is enclosed over at least 90%, e.g., at least 95% of its surface area. The cavity can be, for example, a wall cavity, a ceiling cavity, or a floor cavity. The cavity thus need not be entirely enclosed. The person of ordinary skill in the art will appreciate that the methods described herein can be used in the insulation of a wide variety of building cavities. Such cavities can, in some cases, already have fibrous insulation (e.g., fiberglass) disposed therein. Expanding foam insulation material 120 (e.g., in a mixed and partially-expanded stated) is dispensed through an aperture 115 in the first wall 111 into the cavity 110 from an insulation dispenser 130 (often in the form of a "gun"), either directly from the tip of the dispenser or through a tube 135 extending into the cavity. After a volume of partially-expanded expanding foam insulation material 120 is dispensed, it continues to expand to provide fully-expanded foam insulation 125 disposed in the cavity. In certain embodiments, multiple "shots" of expanding foam insulation material are used to fill the cavity, with the shots of expanded foam insulation being layered on top of one another in the cavity. After the desired amount of material is dispensed and expanded, the aperture can be patched if desired. A number of methods for dispensing expanding foam insulation materials into building cavities are described in U.S. Patent Application Publication no. 2017/0080614, which is hereby incorporated herein by reference in its entirety. The person of ordinary skill in the art can adapt any of the methods described therein, as well as other methods for dispensing expanding foam insulation material, with the metering methods, devices and systems described here.

Each dispensing shot can be of a desired amount of expanding foam insulation material. For example, in certain embodiments, the last dispensing shot of the multiple discrete dispensing shots is substantially smaller than (e.g., no more than 75 wt % of) the penultimate dispensing shot of the multiple discrete dispensing shots. This can help prevent overfill of the wall. The other dispensing shots can be of a desired amount. For example, in certain embodiments as otherwise described herein, but for the last dispensing shot, the multiple discrete dispensing shots are performed to dispense substantially the same amount of expanding foam insulation (e.g., within 20% of the average, or within 10% of the average).

In one aspect, the disclosure provides a method for providing a cavity (e.g., as described above with respect to FIG. 1) of a building with an expanding foam insulation material (e.g., in one or more "shots."). The method includes actuating an insulation dispenser to begin dispensing expanding foam insulation material from the insulation dispenser into the cavity. Then, when a desired amount of the expanding foam insulation material is dispensed, the dispenser is actuated to stop dispensing the expanding foam insulation material. The expanding foam insulation material is then allowed to finish expanding, thereby forming a shot of the expanded foam insulation material in the cavity.

In certain embodiments, the cavity has a first wall having an aperture formed therein, and the expanding foam insulation material is dispensed into the cavity from the insulation dispenser through the aperture. In many common installations, and especially in retrofit installations, it is impractical to access the wall cavity without forming an aperture in a wall thereof. Accordingly, in many embodiments, a method as otherwise described herein includes forming the aperture in the first wall before actuating the orifice to begin dispensing. In certain embodiments, the aperture can be patched after dispensing the expanding foam insulation material.

Figure 2:
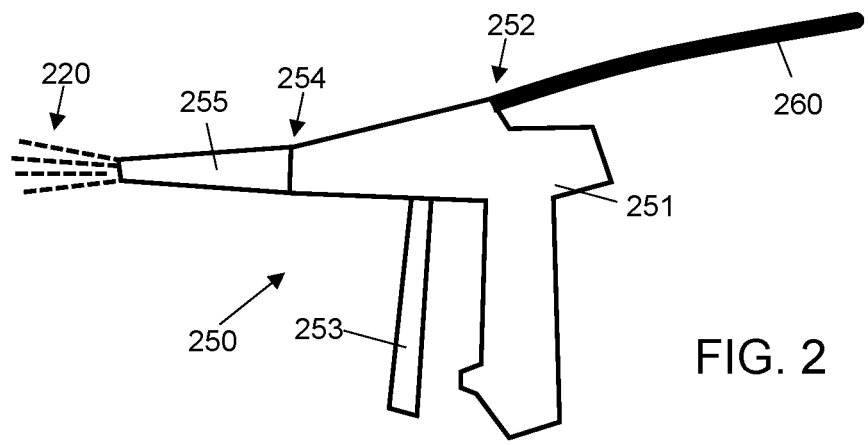
FIG. 2 is a schematic view of an insulation dispenser in the form of an insulation dispenser gun according to one embodiment of the disclosure.

As described above, the user actuates the insulation dispenser to begin dispensing the expanding foam insulation material. Accordingly, the user can position the insulation dispenser properly with respect to the cavity before beginning the flow of the expanding foam insulation material. The manner in which the user actuates the insulation dispenser will depend strongly on the design of the insulation dispenser. One example of an insulation dispenser is shown in schematic view in FIG. 2. Insulation dispenser 250 takes the form of a dispensing "gun." It includes a body 251, which has one or more hoses 260 coupled to the body at one or more input ports 252 thereof to convey a supply of one or more precursors of the expanding foam insulation material. There are often two hoses and two input ports present, one for the "A" component and the other for the "B" component, with the mixing of the reactive mixture happening in the body. The body includes one or more orifices (e.g. needle orifices, not shown) configured to be opened when the trigger 253 is pulled against the body. While the device of FIG. 2 uses a trigger as the user-actuatable actuator, the person of ordinary skill in the art will appreciate that a variety of other types of actuators can be used, e.g., a button or a switch. The one or more orifices control fluid communication between the one or more input ports 252 and output port 254, to which nozzle 255 is coupled, with fluid communication being allowed when the orifice(s) are open and fluid communication not being allowed when the orifice(s) are closed.

Figure 3:
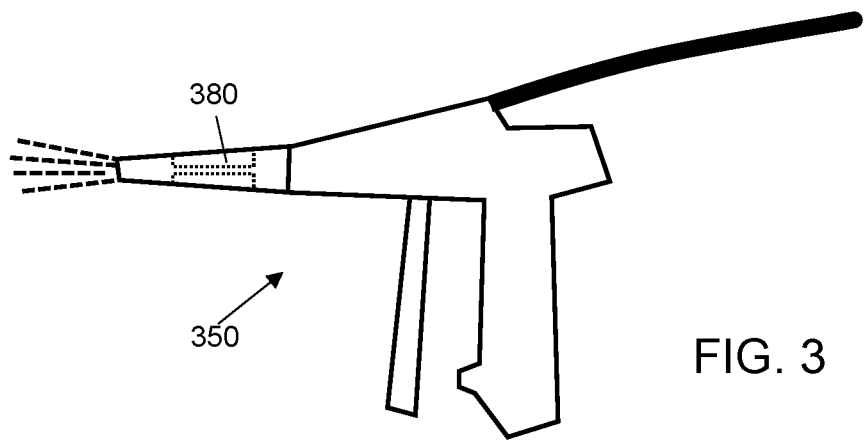
FIG. 3 is a schematic view of an insulation dispenser in the form of an insulation dispenser gun according to another embodiment of the disclosure.

When the dispenser is actuated to begin dispensing by pulling the trigger, the one or more precursors can pass through the body from the one or more hoses 260 to the nozzle 255, from which the expanding foam insulation material 220 can be dispensed. In certain embodiments, the nozzle 255 may provide the necessary force sufficient to break capsules without melting them. For example, the nozzle may have a narrow enough passageway to cause the necessary shear, or in other embodiments may be fit with opposing plates or some other constriction (reference number 380 in the partial-cross-sectional view of dispenser 350 of FIG. 3) to provide additional shearing force. The body can also include a mixing chamber (not shown) in which precursors of the expanding foam insulation material can mix before being conducted to the output port. As the person of ordinary skill in the art will appreciate, various aspects of conventional insulation dispensers can be included in the insulation dispensers described herein, and in many cases conventional insulation dispensers can be adapted to perform as described herein.

Figure 4:
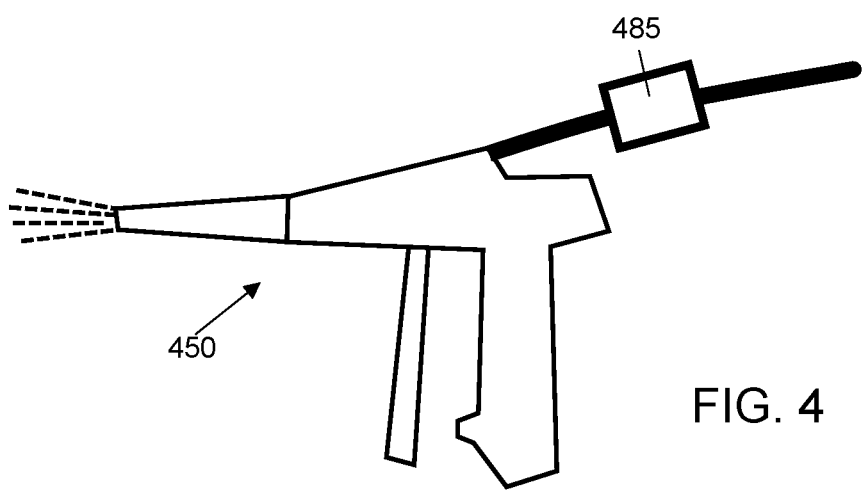
FIG. 4 is a schematic view of an insulation dispenser in the form of an insulation dispenser gun according to another embodiment of the disclosure.

While the capsule-breaking force can be applied to the premix after the components are mixed, in other embodiments, the capsule-breaking force can be applied to the component containing the encapsulated catalyst (e.g., the polyol component), before combination with another component to form a premix. For example, another embodiment of an insulation dispenser according to the disclosure is shown in schematic cross-sectional view in FIG. 4. Here, a conventional insulation dispensing gun 450 can be modified only on its outside to provide the desired functionality. The insulation dispenser includes a shearing device 485 in-line with a tubing carrying the encapsulated catalyst-bearing component. This can take the form, e.g., of a block having a constricted passageway, or a passageway with one or more structures (e.g., indentations, pins, meshes) that provide shear through turbulence).

The person of ordinary skill in the art will appreciate that the capsule-breaking force can be applied at an earlier stage in the dispensing. But it can be desirable to maintain the catalyst in substantially encapsulated form for as long as possible, to prevent the retention in the system after dispensing stops of a substantial amount of material having broken capsules.

Another aspect of the disclosure is an expanded foam insulation material that is the cured product of an expanding foam insulation product prepared by method as described herein.

Another aspect of the disclosure is a premix for an expanding foam insulation, the premix comprising at least one polyol; at least one polyisocyanate; an encapsulated catalyst, the encapsulated catalyst comprising a plurality of catalyst capsules, each comprising an amount of catalyst and a capsule shell encapsulating the catalyst; and a blowing agent (e.g., a HFO or HCFO blowing agent). The materials can be as otherwise described with respect to the methods described above.

Another aspect of the disclosure is a component for an expanding foam insulation, the component comprising either but not both of at least one polyol and at least one polyisocyanate; an encapsulated catalyst, the encapsulated catalyst comprising a plurality of catalyst capsules, each comprising an amount of catalyst and a capsule shell encapsulating the catalyst; and a blowing agent (e.g., a HFO or HCFO blowing agent). The materials can be as otherwise described with respect to the methods described above.

Another aspect of the disclosure provides a system as described herein configured to perform a method as described herein.

Various aspects and embodiments of the disclosure are provided by the following enumerated embodiments, which can be combined in any number and in any combination that is not logically or technically inconsistent.

Embodiment 1. A method for providing a cavity of a building with an expanded foam insulation, the cavity being enclosed by one or more walls including a first wall, the method comprising dispensing an amount of an expanding foam insulation into the cavity, the expanding foam insulation being dispensable and expandable to provide the expanded foam insulation material, the expanding foam insulation material formed from a premix comprising at least one polyol, at least one polyisocyanate, a blowing agent, and an encapsulated catalyst, the encapsulated catalyst comprising a plurality of catalyst capsules, each comprising an amount of catalyst and a capsule shell encapsulating the catalyst, wherein the dispensing is performed to release catalyst from the catalyst capsules, the released catalyst initiating reaction between the at least one polyol and the at least one isocyanate; and then allowing the dispensed amount of expanding foam insulation to substantially finish expanding and curing after it is dispensed in the cavity, thereby forming the expanded foam insulation in the cavity.

Embodiment 2. The method of embodiment 1, wherein the dispensing is performed to apply a force to the encapsulated catalyst sufficient to break shells of the capsules, thereby releasing the catalyst.

Embodiment 3. The method of embodiment 2, wherein the force is a shearing force.

Embodiment 4. The method of embodiment 2 or embodiment 3, wherein the force is sufficient to break capsules without melting their shells.

Embodiment 5. The method according to any of embodiments 2-4, wherein the force is generated by dispensing the premix into the cavity through an orifice (e.g., of an insulation dispenser).

Embodiment 6. The method according to any of embodiments 2-4, wherein the force is generated by passing the encapsulated catalyst through a constriction, e.g., formed by opposing plates, or through a constriction in a passageway.

Embodiment 7. The method according to any of embodiments 1-6, wherein the dispensing is performed without melting shells of the capsules.

Embodiment 8. The method according to any of embodiments 1-6, wherein the dispensing is performed to melt capsules of the encapsulated catalyst, thereby releasing the catalyst.

Embodiment 9. The method according to any of embodiments 1-8, wherein the at least one polyol includes at least one polyether polyol (e.g., a polyethylene oxide/polypropylene oxide polyol) and/or at least one polyester polyol.

Embodiment 10. The method according to any of embodiments 1-9, wherein the at least one polyisocyanate includes toluene diisocyanate or methylene diphenyl diisocyanate (e.g., in an oligomeric or polymeric form).

Embodiment 11. The method according to any of embodiments 1-10, wherein the blowing agent is a hydrofluorocarbon (e.g., unsaturated hydrofluorocarbon such as hydrofluoroolefin or hydrochlorofluoroolefin).

Embodiment 12. The method according to any of embodiments 1-10, wherein the blowing agent is a hydrofluoroolefin selected from trifluoropropene, tetrafluoropropene, pentafluoropropene, tetrafluorobutene, pentafluorobutene, hexafluorobutene, heptafluorobutene, heptafluoropentene, octafluoropentene, or nonafluoropentene.

Embodiment 13. The method according to any of embodiments 1-12, wherein the blowing agent is not a saturated hydrofluorocarbon.

Embodiment 14. The method according to any of embodiments 1-13, wherein the amount of the blowing agent is in a range from 1 wt % to 30 wt %, based on the total weight of the premix.

Embodiment 15. The method according to any of embodiments 1-14, wherein the catalyst is an amine catalyst (e.g., tertiary amine or an oxygenate thereof, and sterically hindered secondary amine or an oxygenate thereof).

Embodiment 16. The method according to any of embodiments 1-15, wherein the amount of the catalyst is in a range from 0.001 wt % to 5 wt %, based on the total weight of the premix.

Embodiment 17. The method according to any of embodiments 1-10, wherein the blowing agent is an unsaturated hydrofluorocarbon (such as hydrofluoroolefin or hydrochlorofluoroolefin) and the catalyst is an amine catalyst.

Embodiment 18. The method according to any of embodiments 1-17, wherein the capsule shells are formed from a polymer (e.g., polystyrene, polyethylene, polyacrylate, polymethacrylate, melamine, polyolefin, polyester, polyamide, polylactate, polyether, polyalkylene glycol, etc.).

Embodiment 19. The method according to any of embodiments 1-17, wherein the capsule shells are formed from a cellulosic material, or a microcrystalline wax.

Embodiment 20. The method according to any of embodiments 1-7 and 9-21, wherein the capsule shells are formed of a material having a melting point substantially greater than a temperature at which the premix is dispensed, e.g., at least 5° C. greater, or at least 10° C. greater, or at least 15° C. greater, or at least 20° C. greater.

Embodiment 21. The method according to any of embodiments 1-7 and 9-21, wherein the capsule shells are formed of a material having a melting point greater than 40° C., e.g., greater than 45° C., greater than 50° C., greater than 55° C., greater than 60° C., greater than 65° C., or even greater than 70° C.

Embodiment 22. The method according to any of embodiments 1-7 and 9-21, wherein the capsule shells are formed of a material having a melting point greater than 100° C., e.g., greater than 125° C., or greater than 150° C.

Embodiment 23. The method according to any of embodiments 1-7 and 9-22, wherein the capsule is formed of a material having a glass transition temperature substantially greater than a temperature at which the premix is dispensed, e.g., at least 5° C. greater, or at least 10° C. greater, or at least 15° C. greater, or at least 20° C. greater.

Embodiment 24. The method according to any of embodiments 1-7 and 9-22, wherein the capsule shells are formed of a material having a melting point greater than 40° C., e.g., greater than 45° C., greater than 50° C., greater than 55° C., greater than 60° C., greater than 65° C., or even greater than 70° C.

Embodiment 25. The method according to any of embodiments 1-7 and 9-23, wherein the capsule shells are formed of a material having a melting point greater than 100° C., e.g., greater than 125° C., or greater than 150° C.

Embodiment 26. The method according to any of embodiments 1-7 and 9-27, wherein the premix is dispensed at a temperature of no more than 50° C., e.g., no more than 40° C., or no more than 35° C.

Embodiment 27. The method according to any of embodiments 1-26, wherein the encapsulated catalyst has a d50 value in the range of 0.1 µm to 100 µm.

Embodiment 28. The method according to any of embodiments 1-27, wherein the premix further comprises a surfactant.

Embodiment 29. The method of embodiment 28, wherein the surfactant is independently encapsulated into the capsule.

Embodiment 30. The method according embodiment 28 or 29, wherein the amount of the surfactant is in a range from 0.1 wt % to 5 wt %, based on the total weight of the premix.

Embodiment 31. The method according to any of embodiments 1-30, wherein the expanded foam insulation material has a flame spread less than 25 at a thickness of 4" as measured by ASTM E84.

Embodiment 32. The method according to any of embodiments 1-31, wherein the expanded foam insulation material has a smoke index less than 450 at a thickness of 4" as measured by ASTM E84.

Embodiment 33. The method according to any of embodiments 1-32, wherein the at least one polyol includes a polycarbonate polyol.

Embodiment 34. The method according to any of embodiments 1-33, wherein the expanding foam insulation material is a polyurethane material having an iso index in the range of 80-450.

Embodiment 35. The method according to any of embodiments 1-34, wherein the expanding foam insulation material is a polyurethane material having an iso index in the range of 110-450, e.g., 110-350 or 110-250.

Embodiment 36. The method according to any of embodiments 1-35, wherein the expanding foam insulation further includes one or more particulate fire retardants selected from melamine polyphosphate, ammonium polyphosphate, and expandable graphite, e.g., present in an amount up to 30 wt %, e.g., 1-30 wt %, or 5-20 wt %, or 1-10 wt %, or 5-15 wt %.

Embodiment 37. The method according to embodiment 36, wherein the expanding foam insulation further includes a hydrophobic silica having an D50 particle size in the range of 10-1000 nm.

Embodiment 38. The method according to any of embodiments 1-37, wherein the expanding foam insulation further includes one or more halogenated flame retardants, e.g., brominated alcohols such as polybrominated diphenyl ethers, tetrabromophthalates and their reaction products, tribromoneopentyl alcohol, dibromoneopentyl glycol, tribromophenol, and reaction products thereof; chlorinated organophosphates such as tris(1,3-dichloroisopropyl) phosphate, (1-chloro-2-propyl) phosphate, 2,2-bis(chloromethyl) propane-1,3-diyl tetrakis(1-chloropropan-2-yl) bis(phosphate), and tris (2-chloroethyl) phosphate; and chlorinated paraffins.

Embodiment 39. The method according to any of embodiments 1-38, wherein the expanding foam insulation material includes a non-halogenated phosphate flame retardant, e.g., triethyl phosphate (TEP), resorcinol bis(diphenyl phosphate), and phosphate plasticizers.

Embodiment 40. The method according to any of embodiments 1-39, wherein the expanding foam insulation material has a maximum foam height, and a time of 95% maximum foam height of no more than 4 minutes, e.g., no more than 3 minutes; or a time of 95% maximum foam height of at least 20 seconds, e.g., at least 40 seconds.

Embodiment 41. The method according to any of embodiments 1-40, wherein the expanding foam insulation has a shrinkage after five minutes of no more than 5%.

Embodiment 42. The method according to any of embodiments 1-41, wherein a maximum temperature in the geometric center of the expanding foam insulation during expansion is no more than 120° C.

Embodiment 43. The method according to any of embodiments 1-42, wherein a maximum temperature in the geometric center of the expanding foam insulation during expansion is no more than 100° C., e.g., no more than 80° C.

Embodiment 44. The method according to any of embodiments 1-43, for a volume of expanded foam insulation material over the range of 1000 $cm^3$ to 100000 $cm^3$, the volume of expanded foam insulation material does not deviate from a linear relationship with the mass of expanding foam insulation material by more than 15%, e.g., does not deviate by more than 10%.

Embodiment 45. The method according to any of embodiments 1-44, wherein the cavity has a first wall having an aperture formed therein, and wherein the expanding foam insulation is dispensed into the cavity from the insulation dispenser through the aperture.

Embodiment 46. The method according to embodiment 45, further comprising forming the aperture in the first wall before dispensing.

Embodiment 47. The method according to embodiment 45 or embodiment 46, further comprising, after dispensing the foam insulation, patching the aperture.

Embodiment 48. The method according to any of embodiments 1-47, wherein multiple discrete dispensing shots are performed, so as to form multiple shots of expanded foam in the cavity, the multiple shots of expanded foam being formed as multiple layers.

Embodiment 49. An expanded foam insulation material that is the cured product of an expanding foam insulation product prepared by method of any of embodiments 1-48.

Embodiment 50. A premix for an expanding foam insulation, the premix comprising at least one polyol; at least one polyisocyanate; an encapsulated catalyst, the encapsulated catalyst comprising a plurality of catalyst capsules, each comprising an amount of catalyst and a capsule shell encapsulating the catalyst; and a blowing agent (e.g., a HFO or HCFO blowing agent).

Embodiment 51. The premix of embodiment 50, as further described with respect to any of the preceding embodiments.

Embodiment 52. A component for an expanding foam insulation, the component comprising either but not both of at least one polyol and at least one polyisocyanate; an encapsulated catalyst, the encapsulated catalyst comprising a plurality of catalyst capsules, each comprising an amount of catalyst and a capsule shell encapsulating the catalyst; and a blowing agent (e.g., a HFO or HCFO blowing agent).

Embodiment 53. The component of embodiment 54, as further described with respect to any of the preceding embodiments.

Embodiment 54. A system as described herein configured to perform a method of any of embodiments 1-48.

It will be apparent to those skilled in the art that various modifications and variations can be made to the processes and apparatuses described here without departing from the scope of the disclosure. Thus, it is intended that the present disclosure cover such modifications and variations of this invention provided they come within the scope of the appended claims and their equivalents.

What is claimed is:

1. A method for providing a cavity of a building with an expanded foam insulation, the cavity being enclosed by one or more walls including a first wall, the method comprising
dispensing at a temperature of no more than 50° C. an amount of an expanding foam insulation into the cavity, the expanding foam insulation being dispensable and expandable to provide the expanded foam insulation material, the expanding foam insulation material formed from a premix comprising at least one polyol, at least one polyisocyanate, a hydrofluoroolefin or hydrochlorofluoroolefin blowing agent, and an encapsulated amine catalyst, the encapsulated catalyst comprising a plurality of catalyst capsules, each comprising an amount of catalyst and a capsule shell encapsulating the catalyst, wherein the dispensing is performed to apply a force to the encapsulated catalyst sufficient to release catalyst from the catalyst capsules by breaking catalyst shells of the catalyst capsules without melting the catalyst shells, the released catalyst initiating reaction between the at least one polyol and the at least one isocyanate; and
then allowing the dispensed amount of expanding foam insulation to substantially finish expanding and curing after it is dispensed in the cavity, thereby forming the expanded foam insulation in the cavity.

2. The method according to claim 1, wherein the force is generated by dispensing the premix into the cavity through an orifice of an insulation dispenser.

3. The method according to claim 1, wherein the force is generated by passing the encapsulated catalyst through a constriction.

4. The method according to claim 1, wherein the at least one polyol includes at least one polyether polyol and/or at least one polyester polyol.

5. The method according to claim 1, wherein the at least one polyisocyanate includes toluene diisocyanate or methylene diphenyl diisocyanate.

6. The method according to claim 1, wherein the blowing agent is a hydrofluoroolefin selected from trifluoropropene, tetrafluoropropene, pentafluoropropene, tetrafluorobutene, pentafluorobutene, hexafluorobutene, heptafluorobutene, heptafluoropentene, octafluoropentene, or nonafluoropentene.

7. The method according to claim 1, wherein the amine catalyst is an tertiary amine or an oxygenate thereof, or a sterically hindered secondary amine or an oxygenate thereof.

8. The method according to claim 1, wherein the capsule shells are formed from a polymer.

9. The method according to claim 1, wherein the capsule shells are formed of a material having a melting point at least 15° C. greater than a temperature at which the premix is dispensed.

10. The method according to claim 1, wherein the capsule shells are formed of a material having a glass transition temperature at least 10° C. greater than a temperature at which the premix is dispensed.

11. The method according to claim 1, wherein the capsule shells are formed of a material having a melting point greater than 60° C.

12. The method according to claim 1, wherein the premix is dispensed at a temperature of no more than 35° C.

13. The method according to claim 1, wherein the force is a shearing force.

14. The method according to claim 3, wherein the constriction is formed by opposing plates.

15. The method according to claim 3, wherein the constriction is a constriction in a passageway.

16. The method according to claim 1, wherein the capsule shells are formed of a material having a melting point at least 20° C. greater than a temperature at which the premix is dispensed.

17. The method according to claim 1, wherein the capsule shells are formed of a material having a melting point greater than 100° C.

18. The method according to claim 1, wherein the capsule shells are formed of a material having a glass transition temperature at least 20° C. greater than a temperature at which the premix is dispensed.

19. The method according to claim 1, wherein the capsule shells are formed of a material having a glass transition temperature greater than 100° C.

* * * * *